US008548715B2

(12) United States Patent
Gallagher et al.

(10) Patent No.: US 8,548,715 B2
(45) Date of Patent: Oct. 1, 2013

(54) METHOD AND SYSTEM FOR CONTROLLING ENGINE PERFORMANCE

(75) Inventors: Shawn Gallagher, Erie, PA (US); Ryan John Goes, Erie, PA (US)

(73) Assignee: General Electric Company, Schenectady, NY (US)

( * ) Notice: Subject to any disclaimer, the term of this patent is extended or adjusted under 35 U.S.C. 154(b) by 946 days.

(21) Appl. No.: 12/648,855

(22) Filed: Dec. 29, 2009

(65) Prior Publication Data

US 2011/0066351 A1 Mar. 17, 2011

(51) Int. Cl.
*G06F 7/70* (2006.01)
*G06F 7/00* (2006.01)
*G06F 17/00* (2006.01)

(52) U.S. Cl.
USPC ..... 701/102; 701/112; 123/179.3; 123/179.4; 123/481; 123/198 F; 123/198 DB

(58) Field of Classification Search
USPC ................ 123/481, 198 D, 198 DB, 198 DC, 123/198 F, 491, 480, 179.3, 179.4, 179.7, 123/179.8, 179.13, 179.14, 179.15; 701/102, 701/101, 112, 115, 103, 104, 105, 106, 113
See application file for complete search history.

(56) References Cited

U.S. PATENT DOCUMENTS 6,243,628 B1 * 6/2001 Bliley et al. .................. 701/29.4
6,636,798 B2 * 10/2003 Biess et al. .................... 701/112
6,650,993 B2 11/2003 Wolf et al.
6,732,055 B2 5/2004 Bagepalli et al.
6,935,307 B2 * 8/2005 Watanabe et al. ........ 123/339.16
6,941,218 B2 9/2005 Wolf et al.
7,131,614 B2 11/2006 Kisak et al.
7,500,436 B2 * 3/2009 Kumar et al. .............. 105/26.05
8,290,691 B2 * 10/2012 Lin et al. ....................... 701/112
2004/0074471 A1 * 4/2004 Watanabe et al. ............. 123/305
2009/0312894 A1 12/2009 Meltser et al.
2011/0066359 A1 * 3/2011 Lin et al. ....................... 701/112
2012/0123662 A1 * 5/2012 Heverley, III ................. 701/101

OTHER PUBLICATIONS

"Auto Engine Start Stop (AESS)," <<http://www.getransportation.com/na/en/aess.html>>, Jul. 9, 2008, General Electric Company, Access date: Jul. 13, 2010, 1 page.

* cited by examiner

*Primary Examiner* — Stephen K Cronin
*Assistant Examiner* — Raza Najmuddin
(74) *Attorney, Agent, or Firm* — GE Global Patent Operation; John A. Kramer

(57) ABSTRACT

Methods, systems, and computer readable storage media are provided for operating a vehicle including an engine that may be automatically shutdown in response to AESS conditions. In one example, the method comprises, determining an AESS emission credit corresponding to an amount of AESS operation; and adjusting an engine operating parameter based on the determined AESS emission credit. Further, in another example, the method comprises retarding injection timing in response to manifold air temperature, wherein an amount of retard is adjusted responsive to an amount of AESS operation.

17 Claims, 6 Drawing Sheets

METHOD AND SYSTEM FOR CONTROLLING ENGINE PERFORMANCE

FIELD

The subject matter disclosed herein relates to a method, system, and computer readable storage medium for controlling engine performance in a vehicle, such as a locomotive.

BACKGROUND

Locomotives (or other vehicles) may be operated with idle reduction strategies, such as using Auto Engine Start Stop (AESS) systems, to reduce the amount of time the engine is kept idling, thereby increasing system efficiency. Recent emissions regulations allow locomotives to take emissions credits for such system efficiencies.

The inventors herein have recognized, however, that idle reduction times vary substantially with ambient temperatures, such as the exterior temperature in the vicinity around the locomotive or other vehicle. Warmer ambient temperatures provide more idle reduction opportunities, while cooler ambient temperatures provide fewer idle reduction opportunities (due to the need to keep the engine running to prevent engine and cooling systems from freezing). On the other hand, cooler ambient temperatures enable cooler manifold air temperatures, which reduce engine NOx emissions. In comparison, during warmer ambient temperatures, engine NOx emissions may be higher due to the manifold air temperature being limited by the capacity of the engine cooling system, thus resulting in greater injection timing retard and thus reduced fuel economy.

BRIEF DESCRIPTION OF THE INVENTION

Methods, systems, and computer readable media are provided for operating a vehicle including an engine that may be automatically shutdown in response to Auto Engine Start Stop (AESS) conditions. In one embodiment, the method comprises, determining an AESS emission credit corresponding to an amount of AESS operation, and adjusting an engine operating parameter based on the determined AESS emission credit. In this way, emission savings from an AESS operation may enable engine operation with less injection timing retard during other engine running operations. For example, increased use of AESS during the summer can enable less injection timing retard at increased manifold air temperatures during that same summer. Alternatively, the savings during the summer may enable less injection timing retard at increased manifold air temperatures during the winter. Thus, distinct locomotive performance recipes with different amounts of injection timing retard for locomotive operation during different seasons can be obtained to improve fuel economy, while still maintaining emission levels.

In another embodiment, a method of operating a vehicle including an engine that may be automatically shutdown in response to AESS conditions comprises, retarding injection timing in response to manifold air temperature, wherein an amount of retard is adjusted responsive to an amount of AESS operation. For example, in response to an elevated manifold temperature, such as, above a first threshold, injection timing may be retarded to address potential NOx emissions issues. The amount of retard may then be adjusted based on an amount of AESS operation. For example, as an amount of AESS operation increases, the amount of retard may be decreased. In another example, as an amount of AESS operation increases, the injection timing retard may be started when manifold temperatures are above a second, higher threshold. By reducing the amount of injection timing retard and/or initiating the injection timing retard at a higher temperature, emissions levels may be maintained while achieving fuel savings benefits based on the amount of AESS operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Vehicles, such as locomotives, may be configured with integrated control systems that improve operation efficiency. One example of such a configuration is illustrated with reference to FIG. 1 wherein an Automatic Engine Start/Stop control system (AESS) monitors locomotive operating parameters and evaluates them against desired operating conditions. As shown in FIG. 2, the AESS may automatically stop an idle locomotive in response to idle-stop conditions, without an operator triggered cue, to enable idle reduction. Similarly, the AESS may automatically restart a shutdown locomotive in response to restart conditions. Alternatively, the AESS may receive operator-triggered cues for engine start-up and/or shutdown. By reducing the amount of time spent by the locomotive in idle conditions, fuel usage and exhaust emissions may be substantially reduced.

Figure 3:
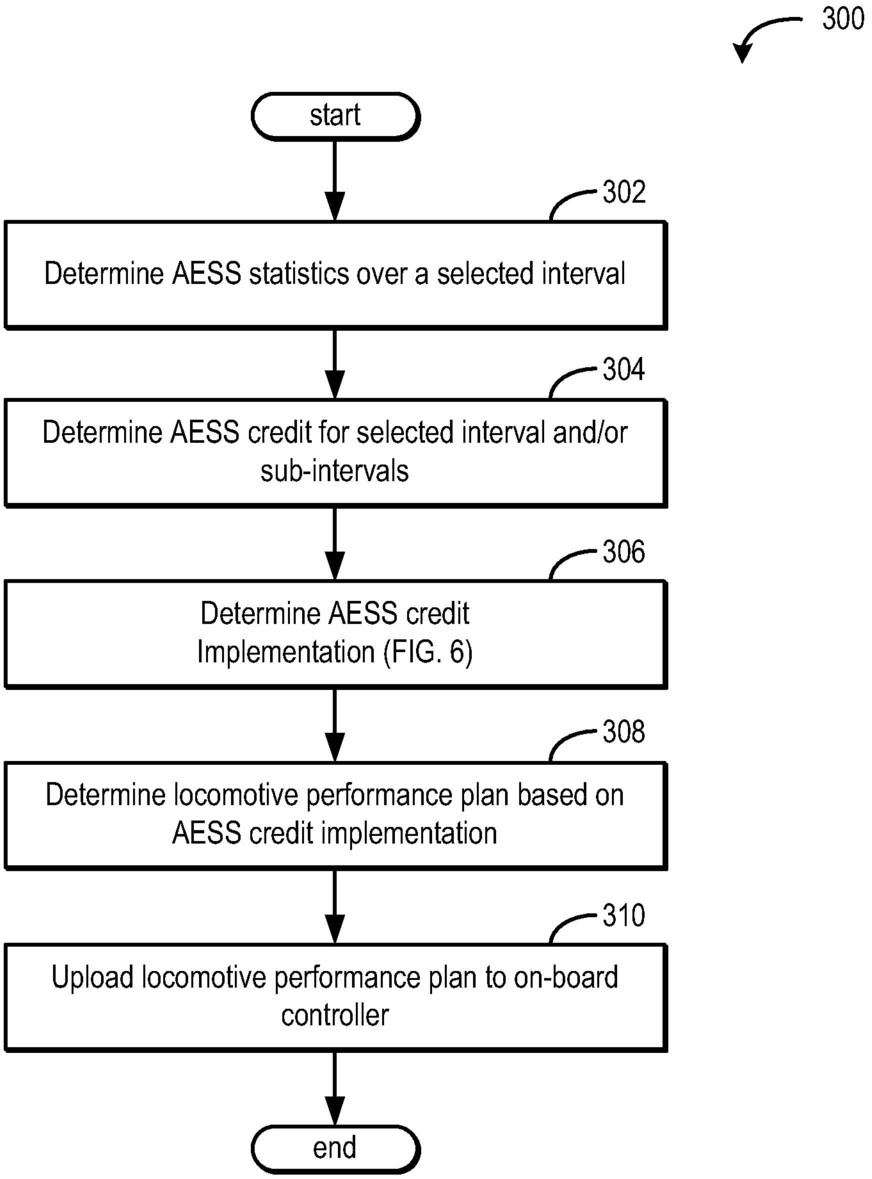
FIG. 3 shows a high level flow chart of an embodiment of a method for adjusting locomotive operations based on AESS credits.
Figure 5A:
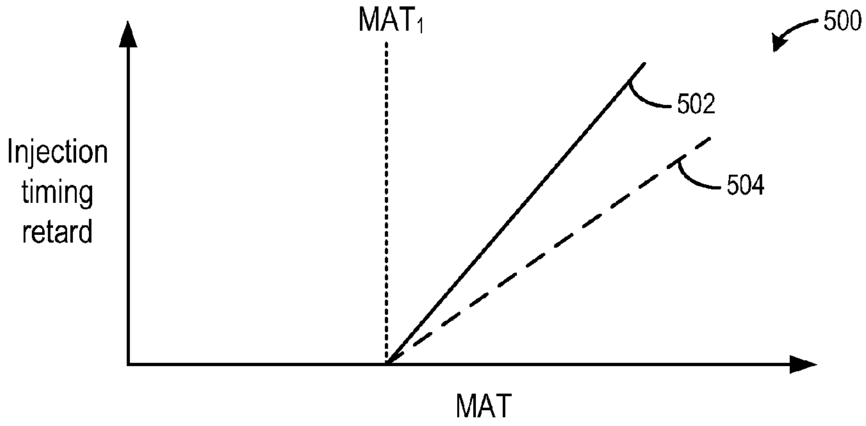
FIGS. 5A-C show graphs depicting example adjustments to injection timing based on AESS credits and manifold air temperature (MAT).
Figure 5B:
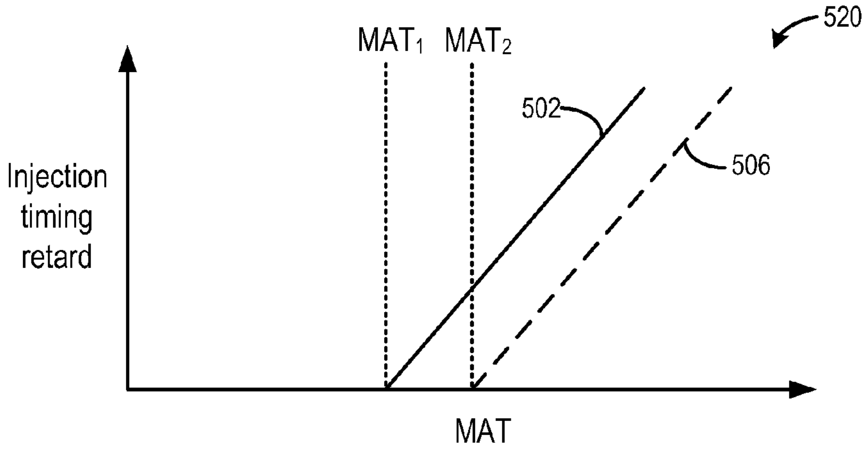
Figure 5C:
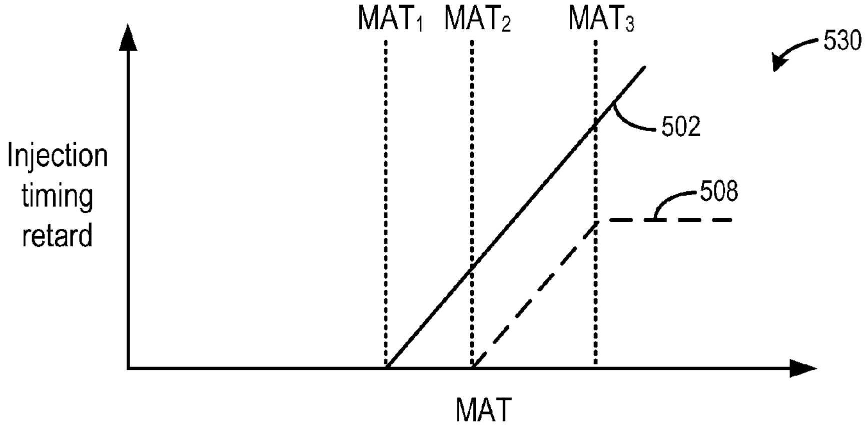
Figure 6:
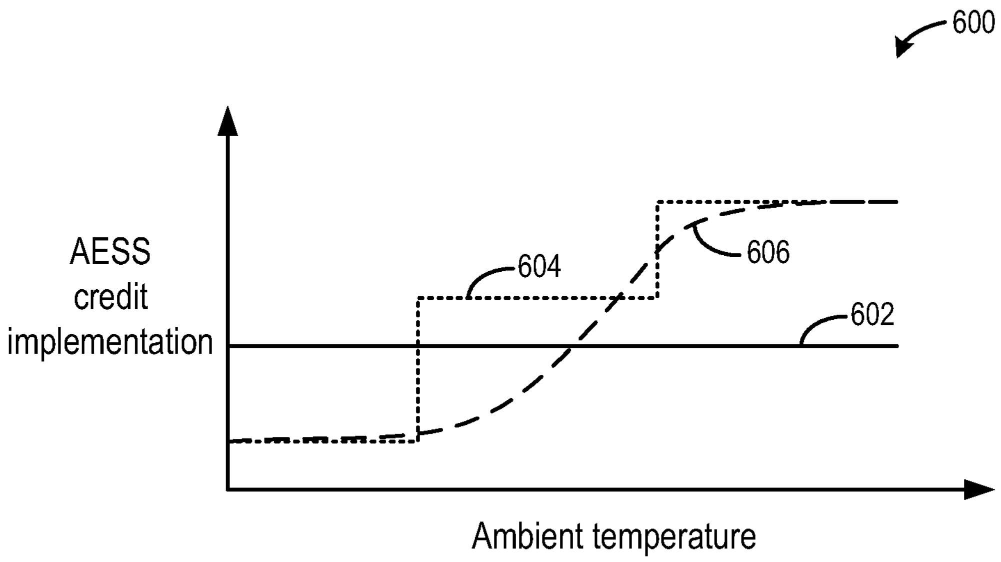
FIG. 6 shows a graph depicting example AESS credit implementations.

AESS emissions credits (herein, also referred to as AESS credits), corresponding to an amount of AESS operation, may be computed for each operation, for example, based on an idle reduction time of the AESS operation. AESS details may be stored in a controller, for example, in an AESS database, and may be used to determine AESS statistics, AESS credit history, etc. AESS credits accrued during an AESS operation may then be used during other engine running operations. As shown in FIG. 3, a controller may determine how to implement AESS credits in an AESS credit implementation plan, for example at a constant rate over a selected interval, or at varying rates over different sub-intervals (FIG. 6). A locomotive performance plan may then be determined based on the AESS credit implementation plan. Therein, one or more engine operating parameters for the selected intervals (or sub-intervals) may be adjusted based on the AESS emission credits available. For example, as illustrated in FIG. 4, and FIGS. 5A-C, an injection timing may be retarded in response to elevated manifold temperatures to address potentially high NOx emission issues, the amount of injection timing retard adjusted based on the determined AESS credits. In this way, by adjusting locomotive operation responsive to an amount of AESS operation, emissions savings from an AESS operation may be applied during other engine running operations to improve overall locomotive exhaust emissions.

Figure 1:
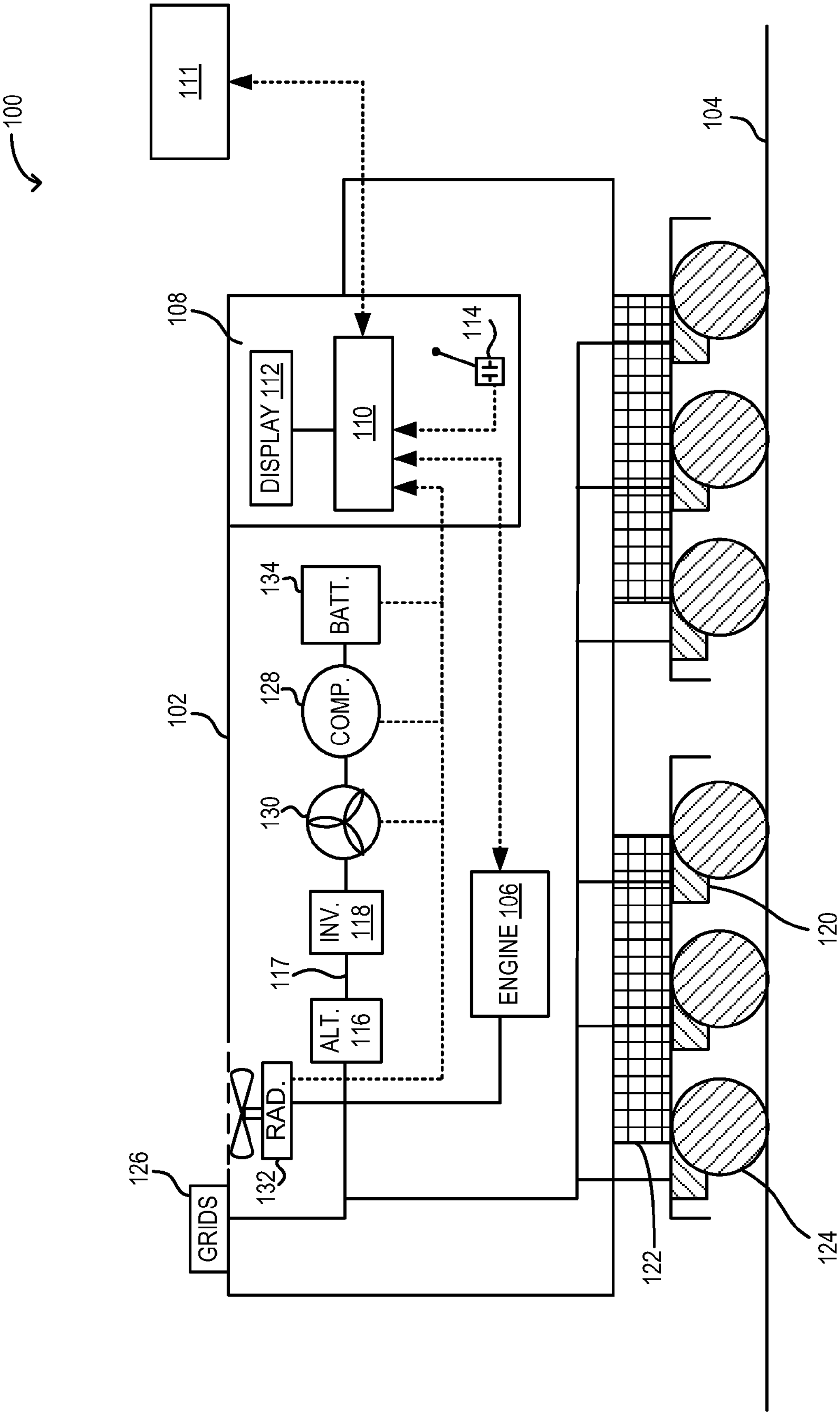
FIG. 1 shows an example embodiment of a diesel-electric locomotive.
Figure 2:
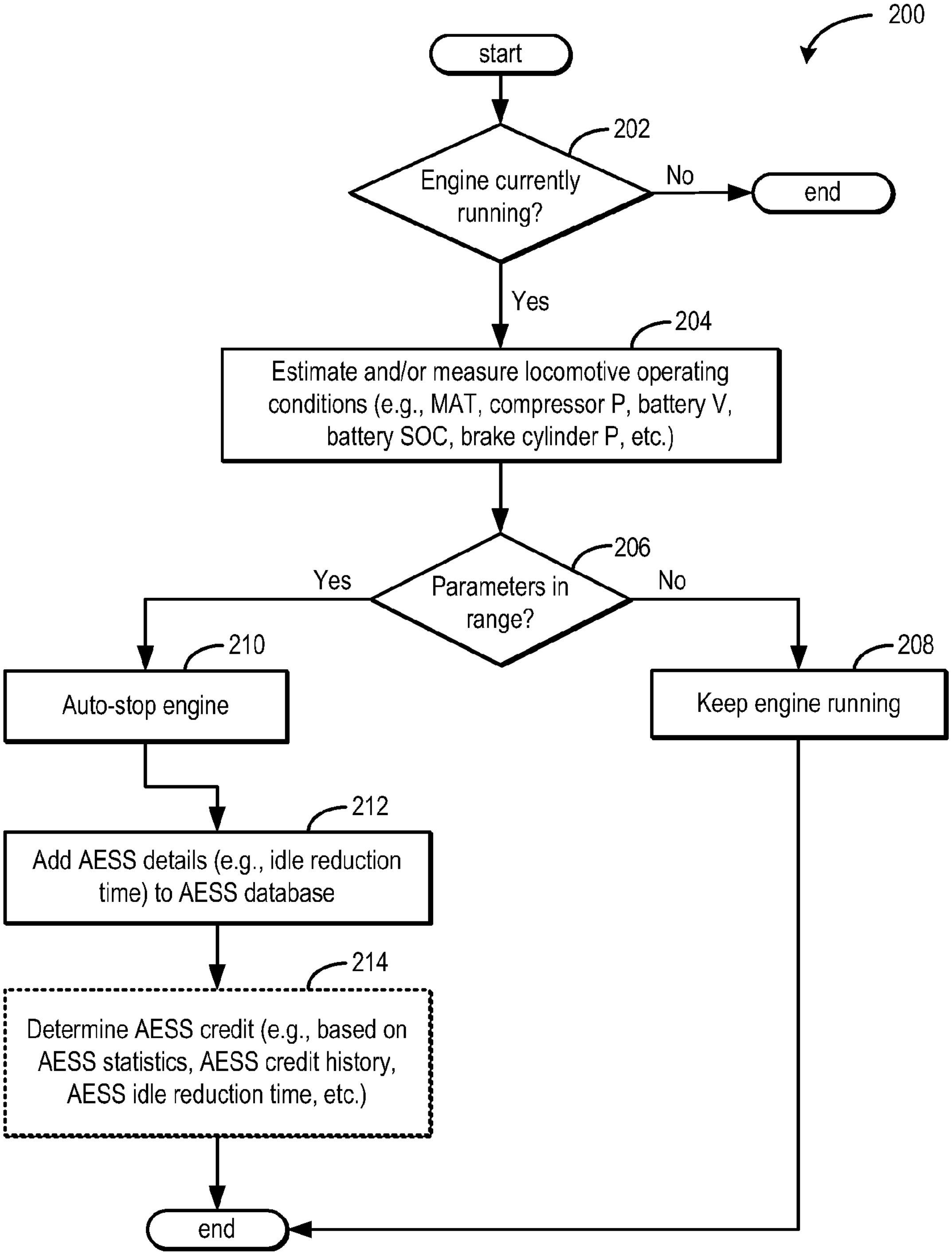
FIG. 2 shows a high level flow chart of an embodiment of a method for an AESS system configured to automatically stop an engine during idle reduction opportunities.

FIG. 1 is a block diagram of an example vehicle or vehicle system, herein depicted as locomotive 100, configured to run on track 104. In one example, locomotive 100 may be a diesel electric vehicle operating with a diesel engine 106 located within a main engine housing 102. However, in alternate embodiments, alternate engine configurations may be employed, such as a gasoline, biodiesel, or natural gas engine, for example.

Locomotive operating crew and electronic components involved in locomotive systems control and management, for example on-board controller 110, may be housed within a locomotive cab 108. In one example, on-board controller 110 may include a computer control system. The locomotive control system may further comprise computer readable storage media including code for enabling an on-board monitoring of locomotive operation. On-board controller 110, overseeing locomotive systems control and management, may be configured to receive signals from a variety of sensors, as further elaborated herein, in order to estimate locomotive operating parameters. On-board controller 110 may be further linked to display 112, such as a diagnostic interface display, providing a user interface to the locomotive operating crew. On-board controller 110 may also be configured to perform an automatic engine start/stop operation (herein also referred to as “AESS”) on an idle locomotive 100, thereby enabling the locomotive engine to be automatically stopped (or started) during AESS opportunities. Alternatively, an operator may manually indicate an intention to motor the locomotive by moving a direction controller, herein depicted by reverser 114.

On-board controller 110 may be in serial communication with remote controller 111, for example, through wireless communication. Remote controller 111 may be housed at a distant location, such as a dispatch center. On-board controller 110 may relay information, such as details of AESS operations performed, to remote controller 111. The AESS details may be stored in an AESS database (in on-board controller 110 and/or remote controller 111) and may be used to compute AESS statistics, AESS credits, AESS credit histories, AESS implementation plans, locomotive performance plan, etc. Thus, remote controller 111 may assist on-board controller 110 in determining operating parameters for locomotive 100 during its mission based on estimated and/or predicted operating conditions. Further, remote controller 111 may be configured to coordinate operation of locomotive 100 with other locomotives in the fleet.

Engine 106 may be started with an engine starting system. In one example, a generator start may be performed wherein the electrical energy produced by a generator or alternator 116 may be used to start engine 106. Alternatively, the engine starting system may comprise a motor, such as an electric starter motor, or a compressed air motor, for example. It will also be appreciated that the engine may be started using energy in a battery system, or other appropriate energy sources.

The diesel engine 106 generates a torque that is transmitted to an alternator 116 along a drive shaft (not shown). The generated torque is used by alternator 116 to generate electricity for subsequent propagation of the vehicle. Locomotive engine 106 may be run at a constant speed, thereby generating a constant horsepower (hp) output, or at variable speed generating variable horsepower output, based on operational demand. The electrical power may be transmitted along an electrical bus 117 to a variety of downstream electrical components. Based on the nature of the generated electrical output, the electrical bus may be a direct current (DC) bus (as depicted) or an alternating current (AC) bus.

Alternator 116 may be connected in series to one, or more, rectifiers (not shown) that convert the alternator’s electrical output to DC electrical power prior to transmission along the DC bus 117. Based on the configuration of a downstream electrical component receiving power from the DC bus, one or more inverters 118 may be configured to invert the electrical power from the electrical bus prior to supplying electrical power to the downstream component. In one embodiment of locomotive 100, a single inverter 118 may supply AC electrical power from a DC electrical bus to a plurality of components. In an alternate embodiment, each of a plurality of distinct inverters may supply electrical power to a distinct component.

A traction motor 120, mounted on a truck 122 below the main engine housing 102, may receive electrical power from alternator 116 through the DC bus 117 to provide traction power to propel the locomotive. As described herein, traction motor 120 may be an AC motor. Accordingly, an inverter paired with the traction motor may convert the DC input to an appropriate AC input, such as a three-phase AC input, for subsequent use by the traction motor. In alternate embodiments, traction motor 120 may be a DC motor directly employing the output of the alternator 116 after rectification and transmission along the DC bus 117. One example locomotive configuration includes one inverter/traction motor pair per wheel-axle 124. As depicted herein, six pairs of inverter/traction motors are shown for each of six pairs of wheel-axle of the locomotive. Traction motor 120 may also be configured to act as a generator providing dynamic braking to brake locomotive 100. In particular, during dynamic braking, the traction motor may provide torque in a direction that is opposite from the rolling direction, thereby generating electricity that is dissipated as heat by a grid of resistors 126 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

Air brakes (not shown) making use of compressed air may be used by locomotive 100 as part of a vehicle braking system. The compressed air may be generated from intake air by compressor 128. A multitude of motor driven airflow devices may be operated for temperature control of locomotive components. The airflow devices may include, but are not limited to, blowers, radiators, and fans. A variety of blowers 130 may be provided for the forced-air cooling of various electrical components. For example, a traction motor blower to cool traction motor 120 during periods of heavy work. Engine temperature is maintained in part by a radiator 132. A cooling system comprising a water-based coolant may optionally be used in conjunction with the radiator 132 to provide additional cooling of the engine.

An on-board electrical energy storage device, represented by battery 134 in this example, may also be linked to DC bus 117. A DC-DC converter (not shown) may be configured between DC bus 117 and battery 134 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running engine 106. The electrical energy stored in the battery may be used during a stand-by mode of engine operation, or when the engine is shut down, to operate various electronic components such as lights, on-board monitoring systems, microprocessors, processor displays, climate controls, and the like. Battery 134 may also be used to provide an initial charge to start-up engine 106 from a shut-down condition. In alternate embodiments, electrical energy storage device 134 may be a super-capacitor, for example.

On-board controller 110 may control the engine 106, in response to AESS instructions, by sending a command to various engine control hardware components such as inverters 118, alternator 116, relays, fuel injectors, fuel pumps (not shown), etc. On-board controller 110 may monitor locomotive operating parameters in idle locomotive 100. Upon verifying that AESS criteria are met, for example in response to operating parameters lying within a desired range, a computer readable storage medium configured in on-board controller 110 may execute code to appropriately auto-stop engine 106 by enabling an AESS routine, as further elaborated in FIG. 2. Further still, on-board controller 110 may monitor locomotive operating parameters in shutdown locomotive 100, and in response to operating parameters falling outside the desired range, a computer readable storage medium configured in on-board controller 110 may execute code to appropriately auto-start engine 106.

Following an AESS operation, AESS details/information may be stored in a database. For example, the AESS details may be added to an AESS history in the database. An amount of AESS operation may then be computed for each operation. The amount of AESS operation may include an idle reduction time of the AESS operation. In one example, the amount of AESS operation may be computed from the AESS details (e.g., AESS start time, end time, or the like). Since AESS opportunities vary largely with ambient temperature, in another example, the amount of AESS operation may be inferred from an ambient temperature. The idle reduction time, along with other AESS details in the AESS database, may be used to determine an AESS emissions credit corresponding to the amount of AESS operation. In one example, the emissions credit may be an amount of NOx reduction corresponding to the idle reduction time. Thus, the AESS credit may determine an amount of NOx reduction (for example, in grams of NOx) that is achieved by shutting down the engine during the AESS operation for the idle reduction time. In one example, the controller may use a model, based on AESS history, to determine an amount of AESS operation (e.g., an idle reduction time, an AESS emission credit) based on the ambient temperature.

The AESS credit then may be implemented during subsequent locomotive operation. In one example, the AESS credit may be used during an immediately subsequent engine running operation, including real-time adjustment of engine operating parameters based on the AESS credits. In another example, the AESS credit may be stored and applied during a later engine running operation. The AESS credits may be, for example, averaged over a selected interval and implemented at a constant rate over the interval. In yet another example, the AESS credits may be applied at varying rates at selected sub-intervals. For example, during conditions of high NOx emissions, a higher amount of emission credits may be implemented to at least partly offset the high emissions. An AESS credit implementation plan may be determined based on AESS history and/or operating conditions, such as an ambient temperature. As further elaborated in FIGS. 3-4, based on the AESS credit implementation plan, and locomotive operating conditions, a locomotive performance plan may be adjusted. Therein, engine operating conditions, such as an engine speed, an engine power (e.g., power distribution between locomotives in a train), and an injection timing of the engine fuel injectors may be adjusted based on the determined AESS emission credit.

FIG. 2 depicts an example AESS routine 200 that may be performed by on-board controller 110 on an idle locomotive (e.g., in stand-by mode) in response to AESS conditions being met. In one example, the locomotive may be in a stand-by mode when parked on a siding for a long term with the engine running at an idling speed, and a computer control system of the locomotive maintained active. In another example, the locomotive may be shifted to a stand-by mode after a threshold duration of engine operation (e.g., 4000 hours). The AESS routine may include monitoring of a plurality of locomotive operating parameters to verify that they are at a desired condition. If the AESS criteria are met, and the engine is idling, the engine may then be automatically shutdown. In this way, by enabling idle time reduction of the locomotive engine, fuel economy and reduced emission benefits may be achieved. AESS emission credits corresponding to the idle reduction time may then be accrued.

Routine 200 may include, at 202, confirming that the engine is running, for example, in an idle or stand-by mode. If the engine is not running, the routine may end. At 204, locomotive operating conditions may be estimated and/or measured. (Unless otherwise specified, the term "estimate" includes a sensor measurement, it being recognized that any sensor measurement may include a small degree of tolerance/error, and may not reflect the exact value of what is sensed.) The parameters monitored may include, for example, manifold air temperature (MAT), ambient air temperature, engine oil temperature, compressor air pressure, main air reserve pressure, battery voltage, a battery state of charge, brake cylinder pressure, etc. At 206, it may be determined whether the parameters are in the desired range. For example, it may be determined whether the estimated locomotive operating parameters are within a desired range of values or outside a desired threshold value. (As should be appreciated, for each operating parameter there may be a different range of values or threshold value.)

If one or more of the estimated locomotive operating parameters are not within the desired range for that parameter, at 208, the locomotive engine may be kept running to allow the parameters to be brought back to the desired condition. In one example, if the battery charge has dissipated and consequently the battery state of charge has dropped, the engine may be run to generate electrical power and recharge the battery to a desired state of charge. In another example, if the compressor air pressure has fallen below a desired value, the engine may be run until the compressor is sufficiently full of compressed air and a desired compressed air storage pressure has been restored.

In comparison, if all the parameters are within the desired range, at 210, the engine may be automatically shutdown, or auto-stopped. By shutting down the engine, the amount of time that the engine spends in idle mode may be reduced. This time may be referred to as the idle reduction time. (In other words, the amount of time the engine spends idling is reduced because during part of that time the engine would otherwise be idled, it is stopped instead.) At 212, details of the AESS operation may be added to an AESS database. For example, an amount of AESS operation, including an idle reduction time corresponding to the AESS operation, may be determined and stored in the AESS database. Other details may include, for example, locomotive conditions (e.g., NOx levels) at the time of AESS execution. In one example, the database may be maintained on the on-board controller. Alternatively, AESS details may be uploaded onto, and stored in, a database on the remote controller. Optionally, at 214, the routine may include the on-board controller determining an AESS emission credit corresponding to an amount of AESS operation. For example, the AESS credit may be computed based on the idle reduction time accrued in the executed AESS operation, a total amount of idle reduction time accrued thus far, AESS credit history (for example, credit accrued in the previous operation, credit accrued in a previous threshold number of operations, credit accrued in the last year, credit accrued since a predetermined time, etc.), AESS statistics, etc.

While the depicted routine illustrates automatically shutting down an idle locomotive engine in response to AESS criteria, it will be appreciated that in alternate embodiments, the controller may additionally or optionally be configured to monitor engine operating parameters during locomotive shutdown conditions and automatically start the engine in response to any of the parameters falling outside a desired range. The engine may then be stopped when the parameter is restored to the desired condition. As such, in the shutdown mode, locomotive 100 may be stationary and parked, with the engine not running, while on-board electronics, such as on-board controller 110, are maintained active. In this way, by maintaining the locomotive operating parameters in an operation ready-state at all times, locomotive efficiency may be improved.

In this way, an emissions credit corresponding to an amount of AESS operation, for example, an idle reduction time of the AESS operation, may be determined. As further elaborated in FIGS. 3-4, an AESS credit implementation plan may be determined for the AESS credits. The credit implementation plan may include details of when (e.g., selected intervals) and how (e.g., rate of credit implementation) the AESS credits are to be used. Based on how the AESS credits are to be implemented, a locomotive performance plan may be determined and communicated back to the on-board controller.

FIG. 3 depicts an example routine 300 for determining an AESS credit implementation plan, and adjusting a locomotive performance plan responsive to how the AESS credits are to be implemented. Specifically, routine 300, which may be a trip optimizing routine or trip planner routine, may be performed off-line, by a remote locomotive controller, for example at a dispatch center, to determine a locomotive performance plan before dispatch of the locomotive. AESS details may be downloaded from the on-board controller onto the remote controller following each AESS operation, or after a threshold number of AESS operations. Alternatively, or additionally, the details may be downloaded at regular time intervals (e.g., every hour, once a day, or the like). The routine may determine AESS credit implementation rates for selected intervals, or sub-intervals, based on locomotive operating conditions, such as emissions levels or ambient temperatures or track details. Following determination of a locomotive performance plan, the plan may be uploaded to the on-board controller before a locomotive is dispatched on its mission. In one example, the performance plan may be generated by the remote controller as part of a mission optimization or planning routine.

At 302, AESS statistics may be determined over a selected interval. The statistics may be based on, for example, AESS details stored in the AESS database and/or AESS details received from the on-board controller. At 304, the routine may include determining AESS credits corresponding to an amount of AESS operation for the selected interval, and/or sub-intervals thereof. In one example, AESS credits may be determined corresponding to an actual idle reduction time of the AESS operation. In another example, AESS credits may be computed using a model, the model based on AESS history. Since AESS opportunities vary with ambient temperature conditions, the AESS credits may also be inferred (for example, using the model) based on the ambient temperature.

The selected interval may be, in one example, a calendar year of locomotive operations. Herein, an average idle reduction time per month of the calendar year may be computed and AESS credits for each month corresponding to the average idle reduction time may be determined. In another example, the calendar year may be divided into sub-intervals based on seasons. Herein, a distinct idle reduction time for each season (e.g., summer, winter, fall and spring) may be computed, and AESS credits may be determined for each season-based sub-interval. In yet another example, the calendar year may be divided into sub-intervals based on ambient temperatures. For example, the routine may determine idle reduction times, and corresponding AESS credits, for a first sub-interval corresponding to ambient temperatures above 80° F., a second sub-interval corresponding to ambient temperatures between 40° F. and 80° F., and a third sub-interval corresponding to ambient temperatures below 40° F. The AESS credits may also be computed based on previous AESS credit history, AESS statistics, etc.

At 306, the routine may include determining an AESS credit implementation plan. As such, this may include determining how and when the accrued AESS credits are to be applied during locomotive operations, for example over the selected interval or sub-intervals. In one example, determining when to implement the AESS credits may include applying the AESS credits in real-time as they are accrued. Herein, AESS credits accrued during an AESS operation may be used to offset emissions of a subsequent operation (for example, an immediately subsequent locomotive operation). For example, AESS credits from AESS operations during the summer may be applied to engine operations during the same summer, or during winter instead. By adjusting when the AESS credits are applied, the emissions savings from an AESS operation may be used to offset higher emissions during selected engine running operations, as desired.

Determining how to implement the AESS credits may include, in one example, accruing AESS credits until a threshold amount of credits is achieved, and then implementing the accrued AESS credits during subsequent locomotive operations. In another example, AESS credits from a predetermined number of AESS operations may be accrued before credit implementation. In yet another example, AESS credits corresponding to a predetermined amount of idle reduction time (e.g., one hour, 24 hours, or the like) may be accrued before the credits are implemented.

In the example of applying the AESS credits in real-time as they are accrued, the on-board controller tracks AESS idle reduction time and adjusts fuel injector injection timing in real-time. For example, base injection timing may be set at a given notch based on engine rpm and engine horsepower. The base injection timing is then adjusted, e.g., retarded, in a first adjustment based on measured MAT. For example, the degree of injection timing retard from base timing may be proportional to the degree of increased MAT from an allowable MAT. Additionally, a second injection timing adjustment may be applied, in addition to the first injection timing adjustment, the second adjustment based on the most current AESS idle reduction duration. The second adjustment may be stored in the on-board controller in the form of a data table as a function of AESS parameters, such as ambient temperature, idle reduction time, or another AESS statistic. In this way, the AESS credits may be applied in real-time.

Determining how to use the AESS credits over the selected interval and/or sub-intervals may further include determining a rate of credit usage. In one example, the AESS credits may be applied at a constant rate (for example, an average rate), irrespective of locomotive operating conditions, over the duration of the selected interval. For example, AESS credits accrued over a calendar year may be applied at a constant monthly rate. In another example, the AESS credits may be applied at varying rates over selected sub-intervals, the rates varied based on one or more locomotive operating conditions. For example, AESS credits accrued over a calendar year may be applied at varying rates during various months. In one example, the rate of AESS credit application may be varied based on ambient temperature (as elaborated in FIG. 6). For example, the AESS credits may be applied at a higher rate during months with higher ambient temperatures (when emission NOx levels are higher), and at a lower rate during months with a lower ambient temperature (when emission NOx levels are lower). For example, as elaborated with reference to FIG. 4, injection timing may be retarded in response to an elevated manifold temperature, and an amount of injection timing retard may be adjusted responsive to the presence of AESS credits. In this way, fuel savings may be achieved by reducing an amount of injection timing retard that would otherwise be used at the increased manifold air temperatures.

FIG. 6 illustrates example AESS credit implementations. Specifically, graph 600 depicts variation in AESS credit implementation with varying ambient temperatures. In one example, as illustrated at 602 (solid line), an average AESS credit rate may be determined for a selected interval and applied irrespective of the ambient temperature. The rate may be a weighted average or an alternate statistical function, such as a mean, or median rate. In alternate examples, as illustrated at 604 and 606, the AESS credits may be applied at different rates at different temperatures. This may include, in one example, as shown at 604 (dotted line), a stepped approach wherein different rates are applied in different temperature ranges. For example, a first, lower rate may be applied in a first, lower temperature range, and a second, higher rate may be applied in a second, higher temperature range. In another example, as depicted at 606 (dashed line), a gradual approach may be used wherein the AESS credit implementation rate is gradually changed with changes in ambient temperature, the rate steadily increased as ambient temperature increases. Herein, the steady rate of increase may be linear, sigmoidal, or an alternate function of the ambient temperature.

In another example, the rate of AESS credit application may be varied based on emissions levels. This may include, for example, a higher rate of AESS credit application during higher exhaust emissions (such as higher NOx emissions), and a lower rate of AESS credit application during lower exhaust emissions. In yet another example, the rate of AESS credit application may be varied based on an amount of AESS operation, or an idle reduction time. This may include, for example, a higher rate of AESS credit application during higher amounts of AESS operation (i.e., higher idle reduction times), and a lower rate of AESS credit application during lower amounts of AESS operation (i.e., lower idle reduction times). In one example, an amount of AESS operation may be inferred from ambient temperatures and AESS statistics over a selected interval. The rates may also be varied based on AESS credit history of a selected interval, or sub-intervals. For example, based on AESS credit history, it may be determined that a higher amount of AESS operation is performed during higher ambient temperatures, and consequently a larger amount of AESS credits are amassed during summer. It may also be determined that a lower amount of AESS operation is performed during lower ambient temperatures and consequently a lower amount of AESS credits are amassed during winter. Consequently, varying an AESS credit implementation rate based on an amount of AESS operation may include higher AESS credit implementation rates during summers and lower rates during winters. In this way, a trend for how the AESS credits are to be implemented may be determined.

Referring back to FIG. 3, at 308, the routine may include determining a locomotive performance plan based at least on the AESS credit implementation plan. Specifically, engine operating parameters, including engine speed, engine power, locomotive power delivery or power distribution, fuel injector injection timing, and manifold air temperature (MAT) may be adjusted based on the determined AESS emission credit and the credit implementation plan. Additionally, or optionally, the performance plan may be based on AESS history. For example, the performance plan may be based on a number of AESS operations performed in a selected interval (e.g., last month, last three months, last year), an idle reduction time accumulated in the selected interval, an absolute amount of AESS credits accumulated in the selected interval, a percentage of AESS credits accumulated as a function of idle time over the lifetime of locomotive operations or over a selected interval (e.g., over the last year), etc.

In one example, the performance plan may be determined as a function of seasons, responsive to temperature based trends previously determined in the credit implementation plan. For example, the performance plan may include a first performance recipe with a first AESS credit rate and a first operating parameter setting when temperatures are above a first threshold (for example, above 80° F.), such as during summer. The performance plan may further include a second performance recipe with a second, lower AESS credit rate and a second operating parameter setting when temperatures are below the first threshold but above a second threshold (for example, between 40° F. and 80° F.), such as during spring and fall. Further still, the performance plan may further include a third performance recipe with a third AESS credit rate, lower than the first and second rates, and a third operating parameter setting when temperatures are below the second threshold (for example, below 40° F.), such as during spring and fall. In alternate embodiments, the intervals may have predefined dates. For example, the first performance recipe may be defined for the months of June-August, the second performance recipe may be defined for the months of September-November and March-May, while the third performance recipe may be defined for the months of December-February. While the example illustrates the same performance recipe for fall and spring, in alternate embodiments, different performance recipes may be determined for each season.

Figure 4:
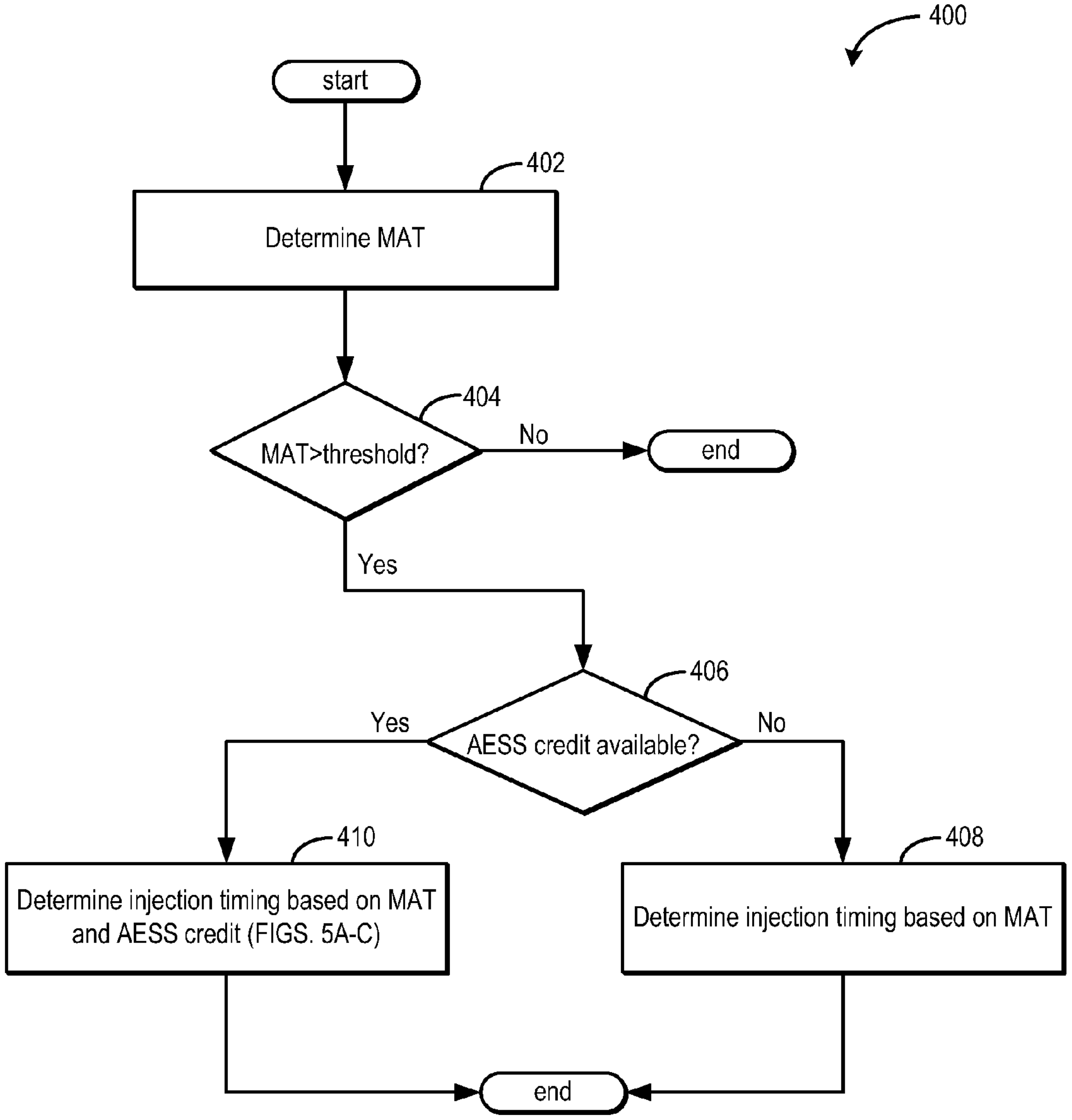
FIG. 4 shows a high level flow chart of an embodiment of a method for adjusting engine injection timing based on AESS credits, according to the present disclosure.

One example of adjusting the operating parameter settings in the locomotive performance plan based on AESS credit implementation is illustrated in FIG. 4, wherein engine fuel injection timing is adjusted responsive to elevated manifold temperatures based on an amount of AESS operation and a corresponding amount of AESS credits. In one example, the control system may have computer readable storage medium with code carrying instructions for determining an AESS emission credit corresponding to an amount of AESS operation and adjusting an engine operating parameter, in the performance plan, based on the determined emission credit. Thus, the technical effect of the determination of the AESS credits may include, for example, changes in injection timing responsive to elevated manifold temperatures based on the presence or absence of AESS credits. The performance plan may include a first setting for injection timing retard responsive to elevated temperatures with a first amount of retard in the absence of AESS credits, and a second setting for injection timing retards responsive to elevated temperatures with a second, smaller amount of retard in the presence of the AESS credits. Following determination of a locomotive performance plan on the remote controller, at 310, the details of the locomotive performance plan may be uploaded to the on-board controller. Then, the locomotive may be operated based on the determined locomotive performance plan.

Now turning to FIG. 4, an example routine 400 is illustrated for adjusting an engine fuel injection timing based on AESS credits. Specifically, the routine retards injection timing in response to elevated manifold temperatures, and adjusts the injection timing retard responsive to an amount of AESS operation. As used herein, adjustment of engine injection timing (e.g., fuel injector injection timing) may include adjusting a start of injection timing, and/or adjusting an end of injection timing. For example, an injector may have an opening timing, an opening duration, and a closing timing. The opening duration, among other parameters such as injection pressure, may be adjusted to control the amount of fuel injection. However, even while maintaining the amount of fuel injection at the same desired level, the timing of when, in relation to piston motion or the combustion cycle, the fuel is delivered, may also be adjusted. As noted above, the amount of fuel delivered may be maintained, yet the timing relative to the piston motion may be delayed (retarded), or advanced, by delaying (or advancing) both the opening and closing of the injector opening. Routine 400 may be executed by a remote controller, for example, to determine at least a part of a locomotive performance plan (FIG. 3). As mentioned, a controller may be configured to retard injection timing responsive to elevated manifold air temperature (MAT) to maintain emission NOx levels. This may, however, lead to degraded fuel consumption. Herein, by applying AESS credits earned from previous AESS operations, the emissions savings of the AESS operation may be used to adjust the fuel injection timing of a subsequent engine operation and obtain fuel savings benefits. Further, by applying the AESS credits at a higher rate during conditions of elevated MAT, and at a lower rate during conditions of lower MAT, and by adjusting the injection timing (for example, an amount of injection timing retard) responsive to the AESS credits, exhaust emissions may be improved without degrading fuel consumption.

At 402, the routine may include, determining a manifold air temperature (MAT). In one example, MAT may be estimated by a dedicated MAT sensor in the engine. In another example, MAT may be inferred from an ambient temperature. At 404, the routine may confirm that MAT is above a threshold. In one example, the threshold may correspond to a temperature above which emission NOx levels may be higher than desired (for example, higher than a regulation-permitted level). If MAT is not elevated, the routine may end.

If MAT is higher than the threshold, at 406, it may be determined whether AESS credits are available. If AESS credits are not available, then at 408, the controller may adjust the injection timing based on the elevated MAT and/or a corresponding NOx emission level. For example, the controller may retard injection timing (for example, later into the compression stroke) by a first, larger amount to reduce engine peak combustion temperatures, thereby reducing NOx levels. In comparison, if AESS credits are available, at 410, the routine may include retarding the injection timing in response to the elevated manifold temperature, wherein the amount of retard is adjusted responsive to the amount of AESS operation. Alternatively, the starting of the injection timing retard may be adjusted responsive to the amount of AESS operation. As illustrated in the examples of FIGS. 5A-C, this may include reducing an amount of injection timing retard as the determined AESS emission credits (for the amount of AESS operation) increases and/or starting the injection timing retard at a higher manifold temperatures as AESS emission credits increase. In this way, AESS credits may be applied, when available, to offset at least some exhaust emissions.

In one example, the amount of AESS operation and the corresponding amount of AESS emission credits may be inferred from an ambient temperature. As such, AESS opportunities may be availed as a function of ambient temperature, with a number of AESS opportunities increasing as an ambient temperature increases. Thus, based on the ambient temperature and further based on AESS statistics (or AESS history), a controller may be configured to infer and estimate an amount of AESS operation, a corresponding idle reduction time, and/or a corresponding AESS emission credit from the ambient temperature. In one example, the controller may use a look-up table to determine an AESS emission credit based on an estimated ambient temperature. Consequently, adjusting an injection timing retard based on an amount of AESS operation over a selected interval may include, retarding the injection timing by a first, lower amount when the ambient temperature is below a threshold, and retarding the injection timing by a second, larger amount when the ambient temperature is above the threshold.

In this way, during conditions of higher ambient temperature, a larger percentage of AESS credits may be applied to at least partially offset the higher exhaust emissions anticipated due to an elevated air charge temperature. Furthermore, the injection timing may be less retarded as AESS credits increase, to enable the emissions credit to largely compensate for the anticipated emissions. Then, during conditions of lower ambient temperature, a lower percentage of AESS credits may be applied. As such, during lower ambient temperatures, lower exhaust emissions may be anticipated and consequently less injection timing retard may be required to address NOx levels. By applying fewer AESS credits during cooler ambient temperatures, the AESS credits may be stored for use during higher temperature conditions when higher emissions are anticipated and the injection timing retard of the cooler temperature conditions may be allowed to largely compensate for the anticipated lower emissions.

In an alternate embodiment, during conditions of higher ambient temperature, a larger amount of AESS credits may be applied and the fuel injection timing retard may be started at a higher MAT, while during conditions of lower ambient temperature, a lower amount of AESS credits may be applied and the fuel injection timing retard may be started at a lower MAT. Further still, combinations of two approaches may be used, as further elaborated in the examples of FIGS. 5A-C.

In this way, during higher ambient temperatures, when higher MATs and consequently higher NOx emissions are anticipated, the higher amount of AESS credits accrued due to longer idle reduction times may be advantageously applied to offset the elevated emissions. Similarly, during cooler ambient temperatures, a smaller percentage of AESS credits may be applied since lower exhaust emissions may be anticipated due to the lower air charge temperature. By varying AESS credits applied based on operating conditions, such as ambient temperature, more credits may be applied during conditions of higher emissions, while AESS credits accrued during conditions of lower emissions may be stored for later use. By adjusting injection timing retard based on an amount of AESS emission credits, fuel losses due to retarded injection timing may be at least partially offset by the AESS credits, thereby improving overall fuel consumption.

Now turning to FIGS. 5A-C, example adjustments to fuel injection timing responsive to AESS are shown. Specifically, the graphs depict changes in injection timing retard (along the y-axis) at different manifold temperatures (MAT, along the x-axis) in the presence or absence of AESS credits. As such, injection timing may be retarded when manifold temperature (MAT) is higher than a threshold ($MAT_1$). In one example, as shown at 502 (solid line) in each of FIGS. 5A-C, in the absence of AESS credits, injection timing may be retarded when MAT is at or above $MAT_1$, and an amount of retard may increase thereafter. It will be appreciated that while the depicted examples illustrate a linear increase in the amount of retard with MAT, in alternate embodiments, injection timing retard may be increased as a different function of MAT (e.g., exponential, sigmoidal, or the like).

In the presence of AESS emission credits, and further based on how the credits are implemented (as elaborated in FIG. 6), the injection timing retard may be adjusted. In one example (FIG. 5A), the AESS credits may be implemented at a higher rate above the threshold temperature ($MAT_1$) and at a lower rate below the threshold temperature ($MAT_1$). Consequently, as shown at 504, an amount of injection timing retard may be reduced as AESS emission credits increase (i.e., shallower gradient). In another example (FIG. 5B), as shown at 506, in response to the AESS credits being implemented at a higher rate above $MAT_1$, the injection timing may be retarded at a higher manifold temperature, such as at $MAT_2$. In still another example (FIG. 5C), AESS credits may be used until a threshold amount of credits are used, and injection timing retard may be adjusted until the threshold amount of credits are used, following which (e.g., above $MAT_3$), no further adjustments to injection timing retard may be performed. Further still, other combinations may be possible.

In one example scenario, based on AESS operations (and AESS statistics) for a locomotive over a calendar year, a controller may determine an overall 30% average idle reduction over the selected interval. When applied at a constant rate to NOx emission levels for the same calendar year, this may translate into an approximate 0.05 line-haul NOx. In another example scenario, the same AESS credits for the same calendar year may be applied at different rates at different sub-intervals based on different idle reductions for those sub-intervals. For example, the locomotive may be operated with a first performance recipe of 80% idle reduction when the ambient temperature is above 80° F. (e.g., summer months) and when the manifold temperature is above 140° F. Herein, in response to manifold temperature being above 140° F., injection timing may be retarded, and an amount of retard may be adjusted based on 80% idle reduction when the ambient temperature is above 80° F. The locomotive may operate with second performance recipe of 40% idle reduction when the ambient temperature is between 40° F. and 80° F. (e.g., spring and fall months) and when the manifold temperature is above 120° F. The locomotive may also operate on a third performance recipe of 5% idle reduction when the ambient temperature is below 40° F. (e.g., winter months) and when the manifold temperature is above 100° F. When applied at a varying rate to NOx emission levels for the same calendar year as the first example scenario, this may translate into an approximate 0.25 line-haul NOx. Thus, substantial emissions and fuel savings benefits may be achieved.

In this way, engine operations, such as an amount of injection timing retard, may be adjusted responsive to an amount of AESS operation (or idle reduction time) and a corresponding amount of AESS emission credits. By applying more credits during conditions of higher emissions, such as at higher ambient temperatures, and fewer credits during conditions of lower emissions, such as at lower ambient temperatures, and by adjusting an amount in injection timing retard accordingly, emissions levels may be reduced without degrading engine fuel consumption.

In another embodiment, AESS emission credits may be applied on a per-vehicle basis as described above (i.e., a vehicle may be controlled based on AESS credits as described above), but the AESS credits are “traded” across plural vehicles in a vehicle consist (meaning a group of vehicles linked to travel together, such as a train), or between different, separate vehicles in a transportation system (such as a fleet of vehicles operated by a common owner), or between different vehicles owned and/or operated by different entities. In other words, AESS emission credits may be generated at one vehicle but used in another vehicle. In one example, a rail vehicle consist includes a plurality of powered rail vehicles (e.g., locomotives) and a plurality of non-powered rail vehicles (meaning vehicles without self-propulsion capability, such as freight rail cars). In the vehicle consist, information relating to AESS credits is communicated between the powered rail vehicles, such that AESS credits generated at one of the powered rail vehicles may be used at another powered rail vehicle in the consist. For this purpose, AESS credits may be communicated to a trip/mission planner or optimization controller (or other controller/control system) in the vehicle consist, with the control system allocating the AESS credits between the various powered rail vehicles in the consist based on different factors, such as locomotive performance/operation parameters, distributed power configuration, differences in locomotive types and performance (e.g., one locomotive is able to better utilize AESS credits than another locomotive), and so on. As one example, in certain operational modes of a vehicle consist, it may be the case that one (or more than one) powered rail vehicle is in a motoring/propulsion mode, while other powered rail vehicles in the consist are in an idle mode. If the idling powered rail vehicles are operated to a shutdown state (where they accrue AESS credits), it may be desirable to immediately transfer those credits to the motoring powered rail vehicles in the consist, instead of saving the AESS credits for later use in the shutdown powered rail vehicles.

In another embodiment, information regarding AESS credits is communicated from a vehicle or other vehicle consist to a central dispatch center or other central control location off-board the vehicle or vehicle consist. In one aspect, the information is communicated for bookkeeping purposes, e.g., for keeping a record of how AESS credits are generated and used in a transportation system. In another aspect, the information is communicated for transferring AESS credits from one vehicle or vehicle consist in a transportation system to another vehicle or vehicle consist in the transportation system, as facilitated/coordinated by the central dispatch center or other central control location. For example, it may be determined (e.g., at the central dispatch center or other central control location) that even though AESS credits are generated at a particular vehicle or vehicle consist (e.g., train) in a transportation system, the AESS credits are better utilized at another vehicle or vehicle consist in the transportation system. Thus, when the information about AESS credits is communicated, the transferring vehicle or vehicle consist is designated as no longer being able to use the AESS credits, and the vehicle or vehicle consist receiving the AESS credits is designated as being able to use the AESS credits. (In the case of a vehicle consist, transferred AESS credits may be used at one vehicle in the consist only, or across multiple vehicles, as coordinated by an on-board control system.) AESS credits may be transferred for redistribution among plural vehicles all owned or controlled by the same entity, or they may be transferred for redistribution among vehicles owned or controlled by different entities. In the case of the latter, value (such as monetary amounts) may be exchanged in consideration for transferring/trading AESS credits among different vehicles. For example, it may be the case that one vehicle or vehicle consist is unable to meet emissions requirements (in a certain region or at a certain time of year) and purchases (or other exchange of value) AESS credits from another vehicle or vehicle consist or from a pool of available AESS credits to offset actual emissions.

One embodiment relates to a method for operating a transportation system where vehicles may be automatically shut down in response to AESS conditions. The method comprises determining an AESS emission credit corresponding to an amount of AESS operation at a first vehicle in the transportation system. The method further comprises adjusting an engine operating parameter of a second vehicle in the transportation system based on the determined AESS emission credit. In one aspect, the first and second vehicles are part of a vehicle consist, e.g., the first and second vehicles may be first and second locomotives or other powered rail vehicles in a train or other rail vehicle consist. In another aspect, the first and second vehicles are separate vehicles, e.g., the first vehicle may be a first locomotive or other powered rail vehicle in a first train or other rail vehicle consist, and the second vehicle may be a second, different locomotive or other powered rail vehicle in a second train or other rail vehicle consist. The engine operating parameter of the second vehicle may be adjusted according to any of the embodiments set forth herein, for example.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc., are used to distinguish one element from another.

The invention claimed is:

1. A method of operating a vehicle including an engine that may be automatically shutdown in response to AESS conditions, comprising, determining an AESS emission credit corresponding to an amount of AESS operation; and adjusting an engine operating parameter based on the determined AESS emission credit.

2. The method of claim 1, wherein the engine operating parameter includes one or more of injection timing, engine speed, and engine power.

3. The method of claim 2, wherein adjusting injection timing based on the determined emission credit includes, retarding injection timing in response to manifold air temperature, an amount of retard reduced as the determined emission credit increases.

4. The method of claim 2, wherein adjusting injection timing based on emission credit includes, retarding injection timing in response to manifold air temperature, and starting the injection timing retard at higher manifold temperatures as the determined emission credit increases.

5. The method of claim 1, wherein the amount of AESS operation is inferred from an ambient temperature.

6. The method of claim 1, wherein the amount of AESS operation includes an idle reduction time of the AESS operation.

7. A method of operating a vehicle including an engine that may be automatically shutdown in response to AESS conditions, comprising, retarding injection timing in response to manifold air temperature, wherein an amount of retard is adjusted responsive to an amount of AESS operation.

8. The method of claim 7, wherein the amount of AESS operation is inferred from an ambient temperature.

9. The method of claim 7, wherein the amount of AESS operation includes an idle reduction time of the AESS operation.

10. The method of claim 7, wherein the amount of retard is adjusted by reducing an amount of injection timing retard as the amount of AESS operation increases.

11. The method of claim 7, wherein the amount of retard is adjusted by starting the injection timing retard at a higher manifold temperature as the amount of AESS operation increases.

12. A vehicle system, comprising:

an engine that may be automatically shutdown in response to AESS conditions; and a control system having computer readable storage medium with code therein, the code carrying instructions for, retarding injection timing in response to manifold air temperatures; and adjusting an amount of retard based on an amount of AESS operation over a selected interval.

13. The system of claim 12, wherein adjusting the amount of retard includes at least one of reducing the amount of retard as the amount of AESS operation increases and starting the injection timing retard at a higher manifold temperature as the amount of AESS operation increases.

14. The system of claim 13, wherein the amount of AESS operation includes an idle reduction time of the AESS operation.

15. The system of claim 14, wherein adjusting the amount of retard based on the amount of AESS operation includes, determining an AESS emissions credit corresponding to the idle reduction time of the AESS operation, and reducing the amount of retard as the AESS emissions credit increases.

16. The system of claim 15, wherein the amount of AESS operation is inferred from an ambient temperature.

17. The system of claim 16, wherein adjusting the amount of retard includes, retarding the injection timing by a first, lower amount when the ambient temperature is below a threshold, and retarding the injection timing by a second, larger amount when the ambient temperature is above the threshold.

* * * * *